United States Patent
Amonou et al.

(10) Patent No.: US 9,516,331 B2
(45) Date of Patent: Dec. 6, 2016

(54) DATA SUBSTREAM DE-ENCAPSULATION METHOD FOR PLURAL SYMMETRICAL SUBSTREAMS AND CORRESPONDING COMPUTER PROGRAMS

(75) Inventors: Isabelle Amonou, Cesson-Sevigne (FR); Nathalie Cammas, Sens de Bretagne (FR); Stéphane Pateux, Rennes (FR); Stéphanie Relier, Domloup (FR)

(73) Assignee: FRANCE TELECOM, Paris (FR)

( * ) Notice: Subject to any disclaimer, the term of this patent is extended or adjusted under 35 U.S.C. 154(b) by 1101 days.

(21) Appl. No.: 13/503,553

(22) PCT Filed: Oct. 14, 2010

(86) PCT No.: PCT/FR2010/052179
§ 371 (c)(1),
(2), (4) Date: Apr. 23, 2012

(87) PCT Pub. No.: WO2011/048303
PCT Pub. Date: Apr. 28, 2011

(65) Prior Publication Data
US 2012/0219066 A1    Aug. 30, 2012

(30) Foreign Application Priority Data
Oct. 23, 2009    (FR) ...................................... 09 57471

(51) Int. Cl.
*H04N 19/70* (2014.01)
*H04N 19/174* (2014.01)
*H04N 19/436* (2014.01)

(52) U.S. Cl.
CPC .......... *H04N 19/436* (2014.11); *H04N 19/174* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 6,185,339 B1* | 2/2001 | Ozaki | ........................... 382/232 |
| 6,211,801 B1* | 4/2001 | Girod | ..................... H03M 7/40 341/67 |

(Continued)

FOREIGN PATENT DOCUMENTS

EP    2023637 A1    2/2009

OTHER PUBLICATIONS

Tsai, Chein-Wu and Ja-Ling Wu, "Modified Symmetrical Reversible Variable-Length Code and its Theoretical Bounds," IEEE Transactions on Information Theory, Apr. 2000, pp. 2543-2548.*

(Continued)

*Primary Examiner* — Joseph Ustaris
*Assistant Examiner* — Edemio Navas, Jr.
(74) *Attorney, Agent, or Firm* — David D. Brush; Westman, Champlin & Koehler, P.A.

(57) ABSTRACT

A method and apparatus are provided for encapsulating a plurality of data substreams encoded in a bit stream, wherein the encoded data substream is obtained by entropy encoding of a symbol subsequence representing an image or a series of images. The method includes grouping data substreams into substream pairs according to an iterative traversal order predetermined from the plurality of substreams, and on the basis of a pair of the substreams, obtaining a symmetrical pair by reversing a data order making up the second substream of the pair. The obtained pairs are then concatenated within a sequence. The binary stream is created by encapsulating the sequence and information related to a number of substreams and related to the sizes of pairs of symmetrical substreams.

4 Claims, 7 Drawing Sheets

(56) References Cited

U.S. PATENT DOCUMENTS

| | | | |
|---|---|---|---|
| 6,510,554 B1 * | 1/2003 | Gordon et al. | 725/90 |
| 6,530,055 B1 * | 3/2003 | Fukunaga | 714/746 |
| 6,741,747 B1 * | 5/2004 | Burns et al. | 382/239 |
| 6,829,299 B1 * | 12/2004 | Chujoh | H04N 19/70 375/240 |
| 2007/0239881 A1 * | 10/2007 | Schneider et al. | 709/231 |
| 2008/0253463 A1 * | 10/2008 | Lin et al. | 375/240.25 |
| 2009/0168868 A1 | 7/2009 | Jahanghir | |

OTHER PUBLICATIONS

S. Wenger et al., "RTP Payload Format for H.264 Video", RFC 3984 from the IETF (Internet Engineering Task Force) Feb. 2005.

"Advanced Video Coding for Generic Audiovisual Services ITU-T Recommendation H.264". ISO/IEC 14496-10 standard, Mar. 2009.

International Search Report and Written Opinion dated Jan. 31, 2011 for corresponding International Application No. PCT/FR2010/052179, filed Oct. 14, 2010.

French Search Report and Written Opinion dated Jul. 2, 2010 for corresponding French Application No. FR 0957471, filed Oct. 23, 2009.

International Preliminary Report on Patentability and English translation of the Written Opinion dated May 1, 2012 for corresponding International Application No. PCT/FR2010/052179, filed Oct. 14, 2010.

\* cited by examiner

DATA SUBSTREAM DE-ENCAPSULATION METHOD FOR PLURAL SYMMETRICAL SUBSTREAMS AND CORRESPONDING COMPUTER PROGRAMS

CROSS-REFERENCE TO RELATED APPLICATIONS

This Application is a Section 371 National Stage Application of International Application No. PCT/FR2010/052179, filed Oct. 14, 2010, which is incorporated by reference in its entirety and published as WO 2011/048303 on Apr. 28, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the coding and decoding of images, and in particular the transport of streams of video data representative of a series of successive images.

The disclosure can thus, in particular, be applied to the video coding implemented in current video coders (MPEG, H.264, etc.) or forthcoming video coders (ITU-T/VCEG (H.265) or ISO/MPEG (HVC)).

BACKGROUND OF THE DISCLOSURE

Current video coders (MPEG, H264, etc.) use a block-wise representation of the video sequence. The images are split up into macro-blocks, each macro-block is itself split up into blocks and each block, or macro-block, is coded by intra-image or inter-image prediction. Thus, I images are coded by spatial prediction (intra prediction), P and B images are coded by temporal prediction with respect to other I, P or B images coded-decoded with the aid of a motion compensation. Moreover, for each block is coded a residual block corresponding to the original block minus a prediction. The coefficients of this block are quantized after an optional transformation, and then coded by an entropy coder.

Of interest here are the data substreams arising from the entropy coder and more particularly the substreams which may be decoded in parallel.

A document US2009168868A1 is known, entitled "Systems and apparatuses for performing cabac parallel encoding and decoding", describing a scheme allowing a type of parallelization of the coding and/or of the decoding in a coder of "CABAC" type. According to one embodiment, an image is split up into slices and the "CABAC" coder is initialized at each start of slice, so as to optimize the initialization of the probabilities. This embodiment allows encoding of slices into independent substreams and therefore parallel decoding of these substreams by several decoders. However, as there is no prediction between the slices, this splitting technique is not effective in terms of compression.

Also known is the document RFC 3984 from the IETF (Internet Engineering Task Force) by S. Wenger, entitled "RTP Payload Format for H264 Video", which establishes a distinction between a coding layer (VCL: Video Coding Layer) and an abstraction layer for the transport of the encoded data on a network (NAL). This layer, the Network Abstraction Layer (NAL), encapsulates the data encoded by the VCL layer of the H.264 coder in units called NALUs (Network Abstraction Layer Units) adapted to the transport of the coded data on the network and to the multiplexing of these data.

This document teaches that an encoded video sequence is represented by a sequence of NAL Units. The NALUs may be NALUs for data (VCL) or for signaling (SEI, SPS, PPS, etc.). When the images are split up into slices, the data substream arising from the encoding of a slice or a part of a slice is encapsulated in an NALU.

According to one embodiment, several NALUs are aggregated in the useful part ("payload" in English) of a transport packet of RTP type. In a particular mode of aggregation, information items representative of the sizes of the aggregated NALUs are inserted into the RTP packet obtained.

According to another embodiment, a slice may be split and inserted into different NALUs, each being transported in a distinct RTP packet.

The insertion of the size of the substreams concatenated in one and the same packet is necessary to allow a decoder to access the various substreams received and to have them decoded by different processors. However, the additional signaling induced generates a cost overhead in terms of bitrate, proportional to the number of substreams.

Moreover, the concatenation of the data substreams requires the processors of the decoder to wait until they have received several substreams before being able to begin the decoding. Now, certain applications propose to begin to decode a video stream as soon as a part of the stream is available at the decoder. In this case, the benefit of using processes working in parallel is lost since, because the decoder receives the substreams one after another, it begins to decode the first substream as soon as the latter is in part received with the aid of a first processor. In order that a second processor can begin to decode in parallel a second substream, this second processor must wait until the first substream has been received completely. The paralleling of the processors is then not optimal since the lag between the start of processing of the processes is too long.

There therefore exists a need for a new technique for encapsulating substreams in a data stream, which allows the parallel decoding of the substreams by a plurality of decoders while limiting the cost overhead in terms of bitrate due to the signaling.

There furthermore exists a need for a new technique for encapsulating substreams in a data stream which makes it possible to rapidly commence the parallel decoding of the coded data relating to the various substreams.

SUMMARY

These objectives, as well as others which will appear subsequently, are reached with the aid of a method for encapsulating a plurality of substreams of data coded in a binary train, a substream of coded data being obtained by entropy coding of a sub-sequence of symbols which is representative of an image or of a series of images, said method comprising a step of creating a binary train encapsulating said plurality of substreams.

According to an embodiment of the invention, said method comprises the following steps:
- grouping of the substreams of data into pairs of substreams according to an order of predetermined iterative scanning of said plurality of substreams;
- on the basis of a pair, obtaining of a symmetric pair by reversal of an order of the data making up the second substream of the pair;
- concatenation of the pairs obtained into a sequence; and in that
- the step of creating the binary train comprises the encapsulation of said sequence and of information items relating to a number of substreams and to the sizes of the pairs of symmetric substreams.

An embodiment of invention therefore includes grouping the substreams into pairs, in rendering these pairs symmetric by reversing the order of the data of the second substream and in indicating in the binary train created the global size of said pairs of substreams instead of the size of each substream.

It is understood that for the same number of substreams, the quantity of signaling data necessary for the parallel decoding of the substreams is halved with respect to the prior art.

The pairs formed are said to be symmetric, since the useful data relating to the second substream are reversed to allow their reading from the end. It is understood that, in this way, as soon as the data relating to the symmetric pair have been received by a decoder, the two substreams can begin to be decoded in parallel, the first from the start, the second from the end.

An embodiment of the invention also relates to a method for de-encapsulating a binary train comprising a plurality of substreams of coded data, a substream of data being obtained by entropy coding of a sub-sequence of symbols which is representative of an image or of a series of images, said binary train being obtained by the encapsulation method according to an embodiment of the invention. The de-encapsulation method according to an embodiment of the invention comprises the following steps:
- extraction of the information items relating to a number of substreams and to sizes of pairs of substreams;
- scanning of the useful data of the binary train received, in the course of which the following steps are implemented:
- as long as the scanning has not finished:
  - identification of a start position and of an end position of a pair on the basis of said extracted information items;
  - dispatching of the useful data relating to the symmetric pair, said data being situated between said start and end positions, to a decoding device able to make two distinct processors perform a decoding in parallel of the useful data relating to the two elements of said pair, from said positions, the first in a usual direction and the second in a reverse direction of reading of the data.

It is understood that the start and end positions of the useful data relating to a pair of symmetric substreams may be easily identified in the binary train on the basis of the information item, transmitted as metadata item in the binary train, relating to the size of said pair of symmetric substreams.

An embodiment of the invention therefore proposes a new and inventive approach to video substream encapsulation, which makes it possible to limit the cost overhead in terms of bitrate due to the signaling of the substreams in the binary train.

According to one aspect of the invention, the encapsulation method furthermore comprises the following steps, intended to be implemented for each pair of symmetric substreams, said pair comprising a first and a second substream:
- splitting of the first and of the second substream into fragments of fixed size;
- grouping of the fragments obtained in a pair of symmetric substreams into pairs of symmetric fragments by tapping off, for each pair, a first fragment in the first substream of the pair from the start of the data relating to the pair of substreams, according to a usual direction of reading, and a second fragment in the second substream of the pair from the end of the data relating to the pair of substreams, according to a reverse direction of reading.

According to this aspect of the invention, the step of concatenating the pairs into a sequence of symmetric pairs is applied to the pairs of fragments obtained and consists in tapping off the pairs of fragments arising from the pairs of substreams according to an order of predetermined iterative scanning of the pairs of substreams and the step of creating the binary train comprises the addition of an information item relating to the fixed size of the fragments.

It is understood that pairs of symmetric fragments are constructed on the basis of the substreams of the pairs of symmetric substreams. They are thereafter concatenated in a sequence which forms the useful data of the binary train created. The pairs of symmetric fragments being of smaller size than the pairs of symmetric substreams, it is possible to commence the decoding more swiftly.

It is furthermore understood that the smaller the fragment is chosen to be, the swifter the commencement of the decoding. This embodiment is well adapted to the applications, relating for example to the setting up of a communication between persons, which require that the decoding terminal begin to decode an image as soon as it has received a part of the data of this image. The size of a fragment is chosen as a function of various criteria, advantageously the dimensions of the image and/or characteristics of the transport protocol used to transport the binary train created.

An embodiment of the invention therefore makes it possible to adapt to the constraints of certain multimedia applications.

According to this aspect of the invention, the de-encapsulation method according to an embodiment of the invention is particular in that the extraction step furthermore comprises the extraction of information items relating to the fixed size of a fragment and the identification and dispatching steps are applied to the pairs of symmetric fragments.

It is understood that the only additional metadata item generated by the fragmentation of the substreams is the information item relating to the fixed size of a fragment. Fragmenting the substreams does not therefore introduce any significant cost overhead in terms of bitrates. Knowledge of the size of a fragment allows the de-encapsulation method to identify the start and end positions of the pairs of symmetric fragments whose size is twice the size of a fragment.

It will be noted that the de-encapsulation method detects when it has scanned the whole of the useful data relating to each pair of substreams, by comparing a variable of size of the useful data scanned for each pair of substreams, incremented by a value of two values of size of a fragment after processing of a symmetric pair, with the size of each pair of substreams, transmitted as metadata item. It does not therefore need any additional information item in order to de-encapsulate the pairs of fragments of substreams of the binary train received.

An embodiment of the invention therefore proposes a solution to the problem of video substream encapsulation, which achieves a compromise between swiftness of commencement of the parallel decoding and cost overhead in terms of bitrate of the signaling necessary for the decoding of these substreams.

According to one aspect of the invention, the encapsulation method is particular in that said information items relating to the sizes of pairs of symmetric substreams comprise the sizes of the pairs of substreams.

An advantage, in the embodiment where the substreams are fragmented, is that these metadata are the same as for the embodiment according to which the substreams are not fragmented. Combined with the information item with the fixed size of a fragment, these metadata make it possible to identify the useful data relating to each pair in the binary train and therefore to de-encapsulate the binary train. The cost overhead of the fragmentation is therefore very low since it is limited to the fixed size of a fragment with respect to the embodiment without fragmentation.

According to another aspect of the invention, said information items relating to the sizes of the pairs of symmetric substreams comprise a number of pairs of fragments per pair of substreams and the size of the pairs of fragments comprising a last fragment of one of the substreams of a pair of substreams.

An advantage is to transport an information item relating to a number of fragments rather than to sizes of pairs of substreams in bits or in bytes.

According to another aspect of the invention, the step of creating the binary train comprises the encapsulation of an information item relating to a mode of encapsulation of the plurality of substreams.

Advantageously, this information item indicates whether a simple (no fragmentation) or complex (fragmentation) mode of encapsulation has been used. This allows a de-encapsulation device according to an embodiment of the invention to adapt the processing that it applies to the binary train received.

An embodiment of the invention also relates to a device for encapsulating a plurality of substreams of data coded in a binary train able to implement the encapsulation method.

The invention also relates to a device for de-encapsulating a plurality of substreams of data coded in a binary train able to implement the de-encapsulation method.

An embodiment of the invention also relates to a device for decoding a plurality of substreams of coded data, a substream of data being obtained by entropy coding of a sub-sequence of symbols which is representative of an image or of a series of images.

According to an embodiment of the invention, the method is particular in that it comprises means for receiving useful data relating to symmetric pairs obtained with the aid of the method for de-encapsulating a binary train according to an embodiment of the invention and means for controlling decoding of the two elements of a pair received at distinct processors.

It will be noted that the elements of a symmetric pair may be substreams or fragments of substreams of fixed size according to the various embodiments of the invention.

An embodiment of invention also relates to a signal carrying a binary train obtained by the method according to the invention.

In a particular embodiment, the various steps of the encapsulation and de-encapsulation methods according to the invention are determined by instructions of computer programs.

Consequently, an embodiment of the invention is also aimed at computer programs on an information medium, these programs being able to be implemented respectively in encapsulation and de-encapsulation devices or more generally in a computer, these programs respectively comprising instructions adapted to the implementation of the steps of the encapsulation and de-encapsulation methods which have just been described.

These programs can use any programming language, and be in the form of source code, object code, or of code intermediate between source code and object code, such as in a partially compiled form, or in any other desirable form.

An embodiment of the invention is also aimed at an information medium readable by a computer, and comprising instructions of a computer program such as mentioned hereinabove.

The information medium may be any entity or device capable of storing the program. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to an embodiment of the invention may in particular be downloaded from a network of Internet type.

Alternatively, the information medium may be an integrated circuit into which the program is incorporated, the circuit being adapted to execute or to be used in the execution of the methods in question.

BRIEF DESCRIPTION OF THE DRAWINGS

Other advantages and characteristics will be more clearly apparent on reading the following description of a particular embodiment of the invention, given by way of simple illustrative and nonlimiting example, and the appended drawings, among which.

DETAILED DESCRIPTION OF ILLUSTRATIVE EMBODIMENTS

An exemplary embodiment of the invention relates to a data substream encapsulation/de-encapsulation technique which applies to video data arising from standards for video compression or images. It may be applied in any video stream transport mechanism, such as MPEG-2 TS for the broadcasting of these data on digital television networks or RTP (Real Time Protocol in English) for their transport on Internet networks.

It is intended for at least two types of applications. The first type of application is that where the decoding terminal waits until it has received all the packets corresponding to an image of the video sequence before commencing its decoding. Television on ADSL, for example, requires a buffering of several images to ensure quality of service (QoS). The second type of application is that where the decoding terminal commences the decoding of an image as soon as it has received a part of the data of this image. These are, for example, television services on mobile or Internet or else video-conferencing, for which it is important to limit a latency time before the display of the first complete image.

It will be noted that the encapsulation method according to an embodiment of the invention is implemented upstream of a data transport protocol. The binary train created according to an embodiment of the invention will thereafter be able to be formatted according to the chosen transport protocol, whether this be for example UDP, MPEG-2 TS or else RTP. If the binary train is too large with respect to the maximum size permitted according to this transport format, the latter handles the fragmentation of the binary train as it would do for a conventional binary train.

Figure 1:
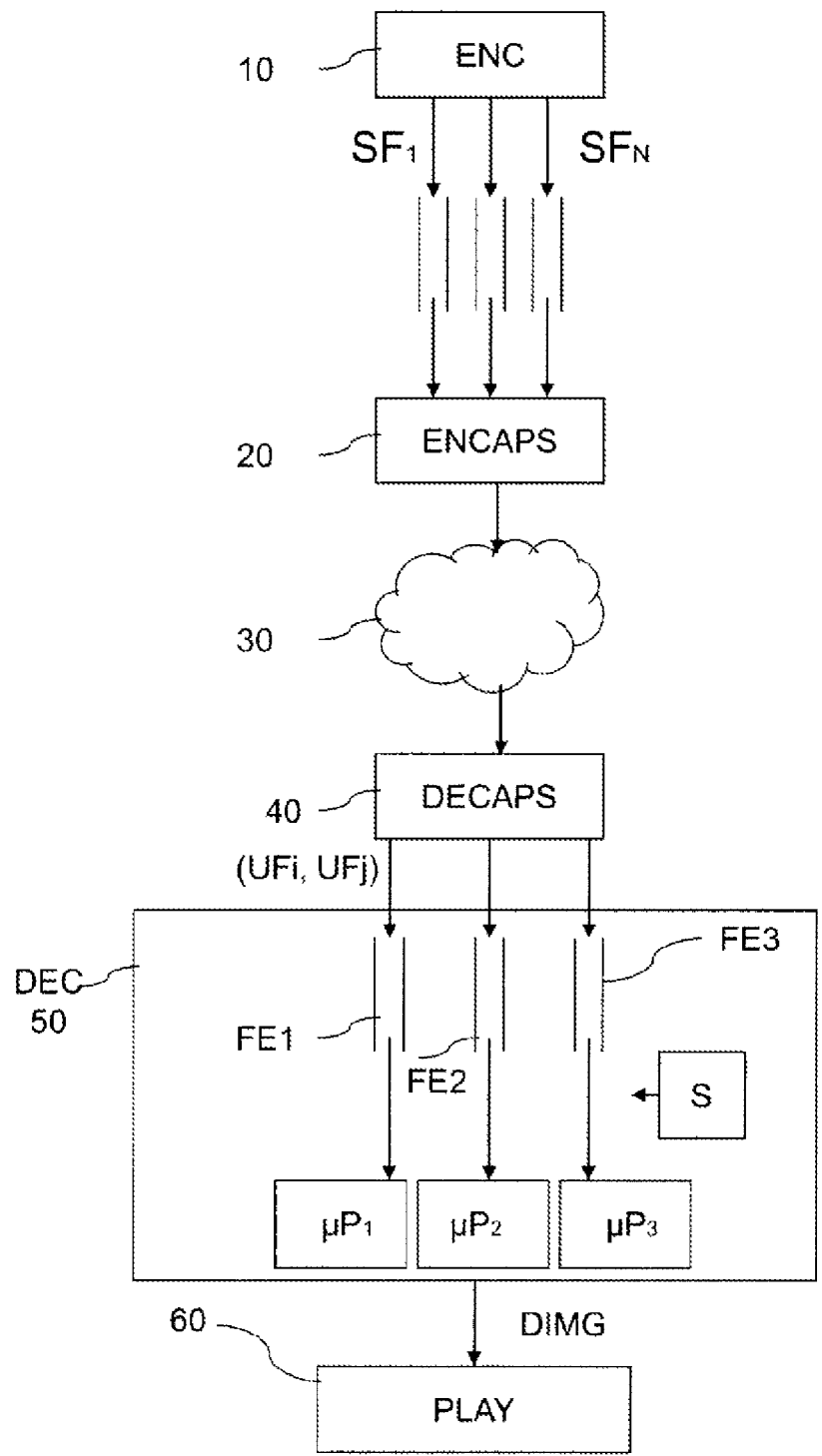
FIG. 1 presents in a schematic manner a context of implementation of an embodiment of the invention.

An exemplary context of implementation of the invention is presented in conjunction with FIG. 1. An image or series of images IMG is encoded by an encoding device ENC, such as, for example the H264 encoder, described in the ISO/IEC 14496-10 standard, "Advanced Video Coding for Generic Audiovisual Services ITU-T Recommendation H.264". Such an encoder produces a stream of coded data.

In a known manner, such a stream of data can consist of a plurality of coded data substreams representative of subsequences of images of slice type. Such substreams are independent of one another and may be decoded in parallel, as described in the document RFC 3984 by S. Wenger, entitled "RTP Payload Format for H264 Video" cited previously.

As a variant, an encoder can produce a plurality of coded data substreams representative of another type of subsequences of images, which exhibit dependencies with one another for decoding, but may be decoded in parallel as long as scheduling constraints imposed by these dependencies are adhered to.

In the context of an embodiment of the invention, the case is considered where a plurality of independent or non-independent substreams of coded data SF1, SF2, ..., SFN, with N an integer greater than or equal to 2, is obtained.

The plurality of substreams of data SF1, SF2, ..., SFN is thereafter processed by an encapsulation device ENCAPS according to an embodiment of the invention. Such a device is able to provide a binary train TB comprising a concatenation of pairs of substreams or of fragments of substreams extracted from the plurality of substreams.

The binary train TB is thereafter transported via a telecommunications network 30 up to a de-encapsulation device DECAPS 40 according to an embodiment of the invention able to extract the useful data of the pairs corresponding to the N substreams and to present them to the input queues $FE_1$ to $FE_N$, of a decoding device DEC 50, which will be distributed by a sequencer S to the K processors able to decode in parallel the data placed in the queues $FE_1$ to FEN according to the commands of the sequencer S, for example as a function of their state of loading. It will be noted that the data corresponding to a pair will advantageously be able to be placed in two queues, in such a way that a first processor obtains the data corresponding to the first element of the pair in a first queue and a second processor the useful data corresponding to the second element of the pair in a second queue.

A decoded image DIMG is thereafter obtained and displayed with the aid of a display device 60.

Figure 2A:
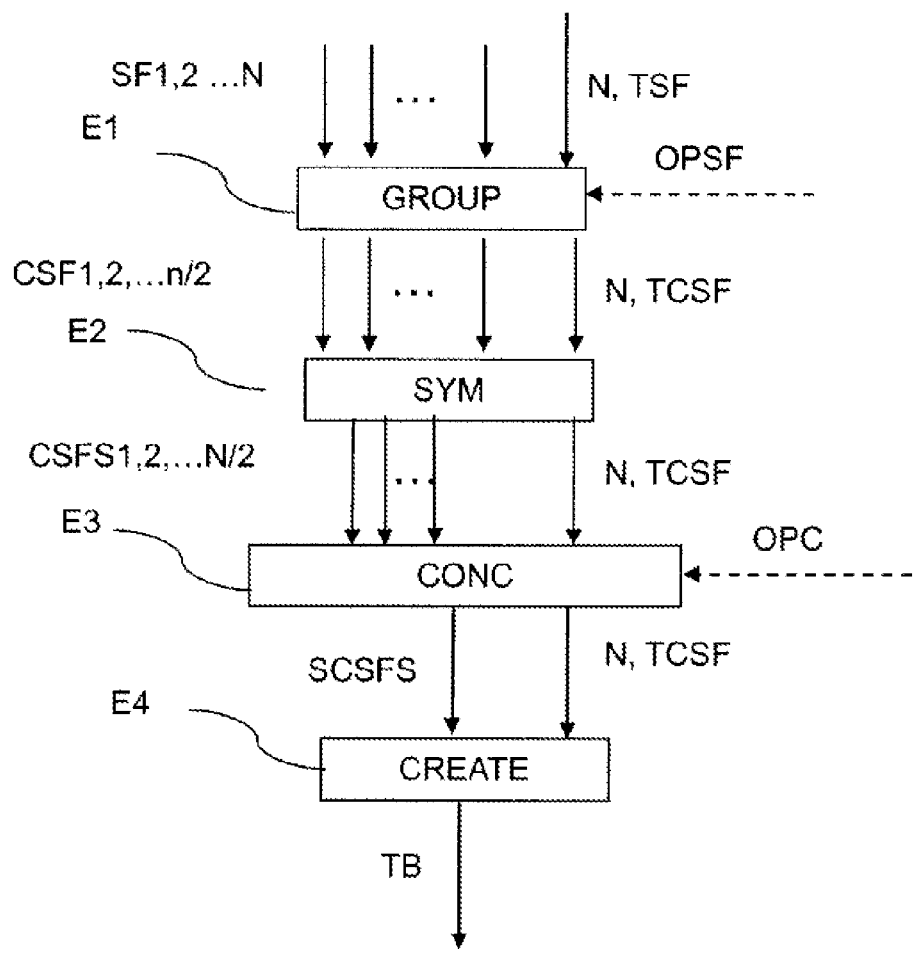
FIG. 2a presents the main steps of the encapsulation method, according to a first embodiment of the invention.

The encapsulation method according to an embodiment of the invention will now be described in conjunction with FIG. 2a. Such a method receives as input a plurality of substreams of data SF1, SF2, ..., SFN coded by an encoder.

According to a first step E1, the substreams SF1 to SFN are grouped into pairs of substreams CSF according to an order of predetermined iterative scanning OPSF of the substreams. In an advantageous manner, this order of scanning adheres to substream scheduling constraints relating to dependencies for the decoding. The number N of substreams and the sizes of the substreams are information items obtained from the device for encoding the image or series of images into the plurality of substreams.

According to a second step E2, the coded data of the second substream of each pair are reversed. On completion of this step, the data thus reversed must be read starting from the end of the sub-sequence formed by this pair of substreams, termed a pair of symmetric substreams CSFS. At the end of this operation, a plurality of pairs of symmetric substreams is obtained.

According to a step E3, the pairs of symmetric substreams are concatenated according to an order of predetermined iterative scanning of the pairs OPC, to form a sequence of pairs of symmetric substreams SCSFS. Advantageously, the order of scanning is the same as that of the scanning of the substreams.

According to a step E4, a binary train TB is created by concatenating metadata comprising the number of substreams N, the sizes of the pairs of substreams obtained and the sequence of symmetric substreams SCSFS.

Figure 2B:
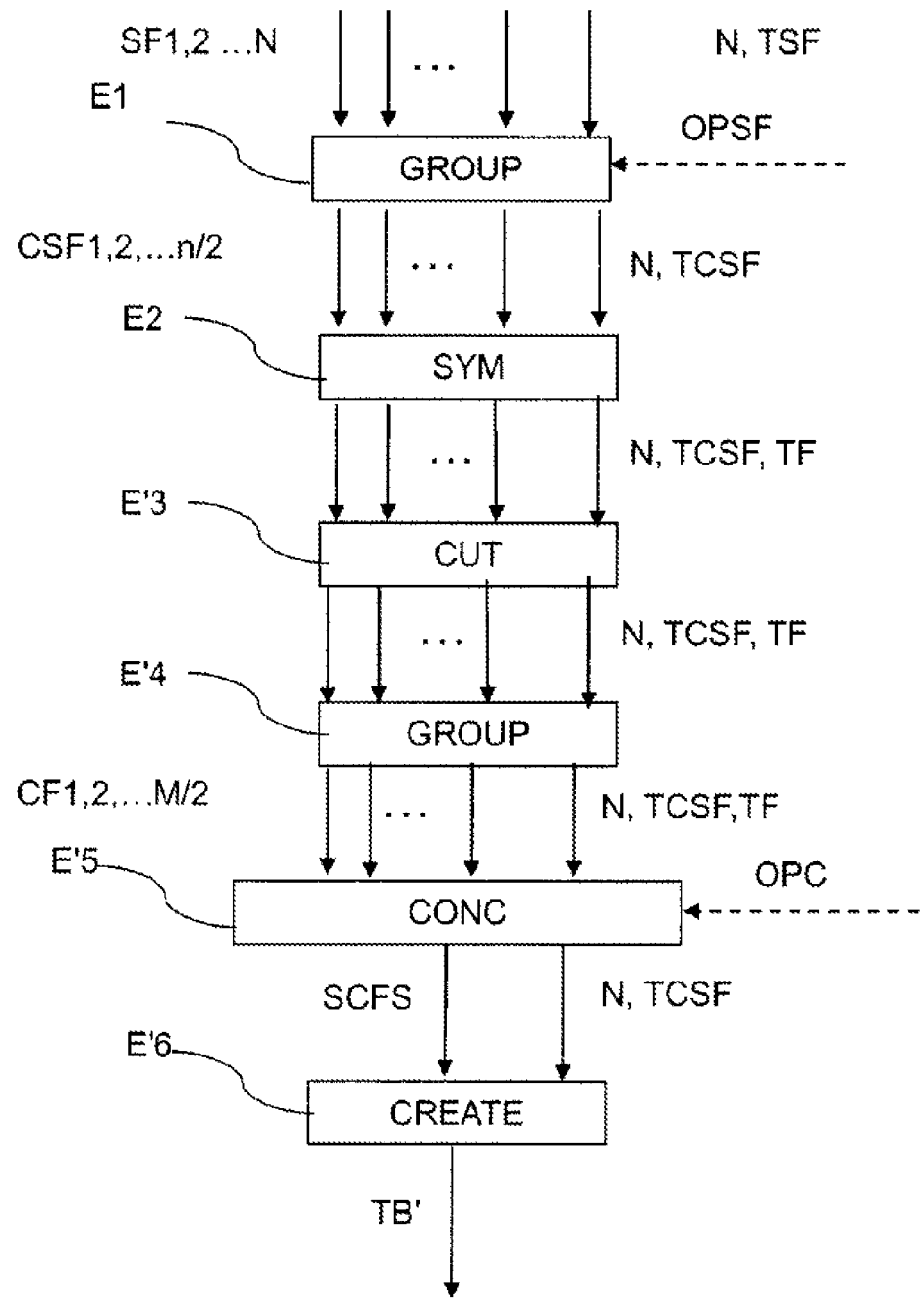
FIG. 2b presents the main steps of the encapsulation method, according to a second embodiment of the invention.

The encapsulation method according to one embodiment of the invention will now be described in conjunction with FIG. 2b. Steps E1 and E2 are unchanged. In E'3, the substreams of the pairs of symmetric substreams CSFS are split up into fragments of fixed size. The size TF of a fragment is an additional metadata item necessary for the implementation of an embodiment of the invention. In E'4, the fragments obtained for each pair of symmetric substreams are grouped by tapping off a fragment in the first substream and a fragment in the second substream. For each substream of the pair considered, the order of reading is adhered to, namely a usual order of reading from left to right for the first substream and a reverse order of reading for the second. On completion of this step, pairs of symmetric fragments CFS are obtained for each symmetric pair of substreams CSFS.

In E'5, the pairs of symmetric fragments are concatenated according to an order of predetermined iterative scanning of the pairs of symmetric substreams so as to form a sequence of pairs of symmetric fragments SCFS.

In E'6, a binary train TB' is created by concatenating metadata comprising the number of substreams N, information items relating to the sizes of the pairs of substreams obtained, optionally the size TF of a fragment and the sequence of symmetric fragments SCFS.

As a variant, the size of a fragment may be known a priori to the encapsulation and de-encapsulation devices able to implement respectively the encapsulation and de-encapsulation methods according to an embodiment of the invention.

In the context of the H264 standard, the binary train created by the encapsulation method according to an embodiment of the invention can advantageously take the form of an NALU. In this embodiment, the metadata relating to the number of substreams transported, to the number of symmetric pairs and to their respective sizes may be placed at the level of the VCL layer (Video Coding Layer) in the header of the NALUs containing the useful data of the image.

As a variant, the number of substreams of data can also be defined in an NALU of higher level, for example an NALU of SPS type.

During the signaling of a size of a substream of data, the number of bits used may be of variable length. For example, knowing the size of the useful part (payload) of the NALU, it is possible to define the number of bits or bytes necessary to represent any smaller size (i.e. IntSup(Log_2(size))).

The binary train created will thereafter be able to be transformed into transport packets for example of RTP (Real Time Protocol in English) type such as described in the document RFC 3984 by S. Wenger, entitled "RTP Payload Format for H264 Video" and cited previously.

Figure 3A:
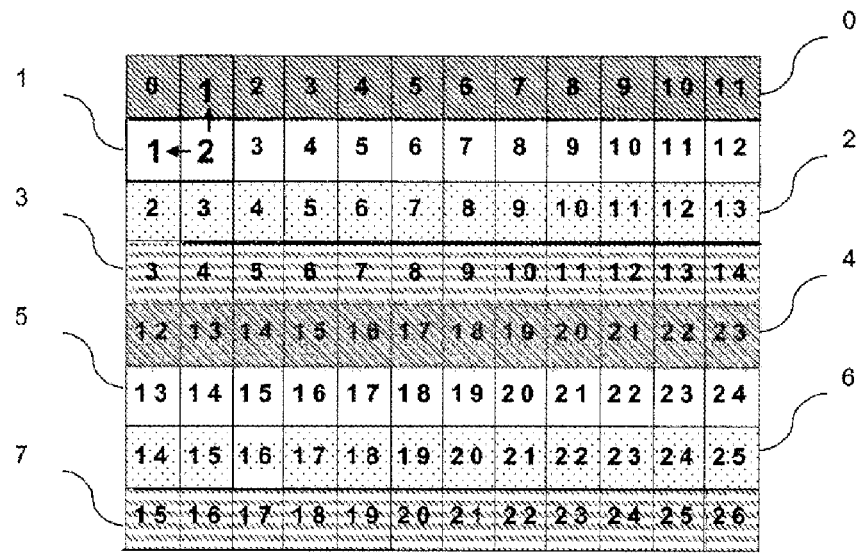
FIG. 3a presents an example of dependencies between several substreams of coded data representative of an image.

In conjunction with FIG. 3a, an exemplary substream exhibiting dependencies for the decoding is now presented. An image split up into sets of blocks of fixed size, called super-blocks, has been represented. The sub-sequences of coded symbols considered here are representative of these super-blocks. They have been grouped into 4 substreams and appear hatched according to one of the 4 patterns associated with these substreams. It is understood that in this example all the super-blocks of one and the same line of the image have been grouped together in one and the same substream, for example substream 0 has been assigned to line 0 at the top of the image and to line 4. Thus, the super-blocks numbered from 0 to 11 of line 0 and 12 to 23 of line 4 form substream 0. The dependencies between coded super-blocks are represented with the aid of numerals indicated inside the super-blocks. For example, the super-block numbered 2 of line 1 depends on the neighbor super-blocks numbered 1. This entails those situated respectively above it and to its left. These neighbor super-blocks must necessarily have been decoded before the decoding of the super-block numbered 2 can begin.

Such dependencies arise for example from an entropy coding step which uses, for the encoding of the current super-block numbered 2 of line 1, symbol occurrence probabilities stored for the two neighbor super-blocks numbered 1. During the decoding of the current super-block numbered 2, the decoder must therefore previously recover the stored probabilities subsequent to the decoding of the two super-blocks of line 0. It follows from this that substream 1 must therefore be decoded with delay with respect to substream 0.

More precisely, if line 1 is considered, it may be seen that from the moment super-blocks 0 and 1 of line 0 are decoded, the blocks of line 1 may also be decoded. Indeed, block 2 of line 1 needs super-blocks 1 of lines 0 and 1 decoded, and so on and so forth.

It is therefore understood that the various lines of this image may be decoded in parallel, by adhering to the dependency constraint, that is to say by beginning the decoding of line 0 before the decoding of line 1, and so on and so forth.

From a temporal point of view, if it is considered that the numerals of the blocks correspond to the instant at which they are decoded, it may therefore be seen that at the instant t=4 for example, the super-blocks 4 of lines 0, 1, 2 and 3 may be decoded.

The scheduling constraints associated with such dependencies are simple and apply in the same manner to all the super-blocks of the image, with the exception of those of the first line and of the first column, for which a single of the two neighborhoods must be considered. It follows from this that these constraints may be translated into the form of simple rules, either implicit or explicit, and stored in a memory which can be accessed by the device implementing the method according to an embodiment of the invention. They can also be transported in the stream in the NALUs for parameters, for example of SPS type.

During the implementation of step E4 of concatenating the plurality of symmetric pairs CS(UFi,UFj), the encapsulation method according to an embodiment of the invention advantageously consults the rules RD, if any, relating to the scheduling of the substreams and applies them to obtain the sequence SCS of symmetric pairs.

Figure 3B:
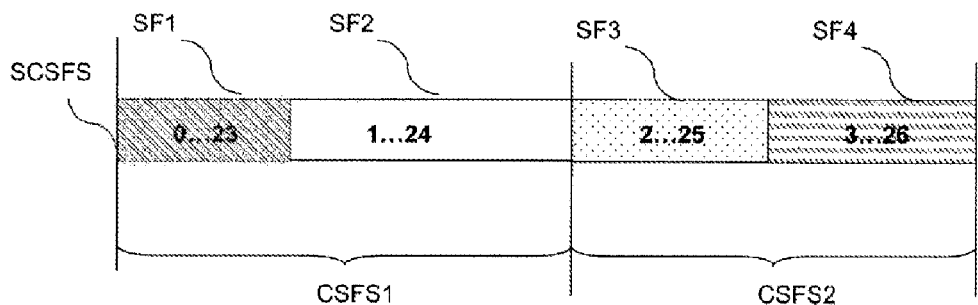
FIGS. 3b and 3c present two examples of binary trains obtained according to the invention on the basis of the substreams representative of said image.

In conjunction with FIG. 3b, a case of simple encapsulation of the substreams SF1 to SF4 of the example of FIG. 3a is presented. The formation of the pairs of substreams is done taking account of the scheduling constraints defined hereinabove. The substreams are scanned in the order of the lines of the image (from top to bottom) and the substreams are tapped off in the order of the columns. It follows from this that the first pair is formed of the substream comprising lines 0 and 4 and of the substream comprising lines 1 and 5.

Figure 3C:
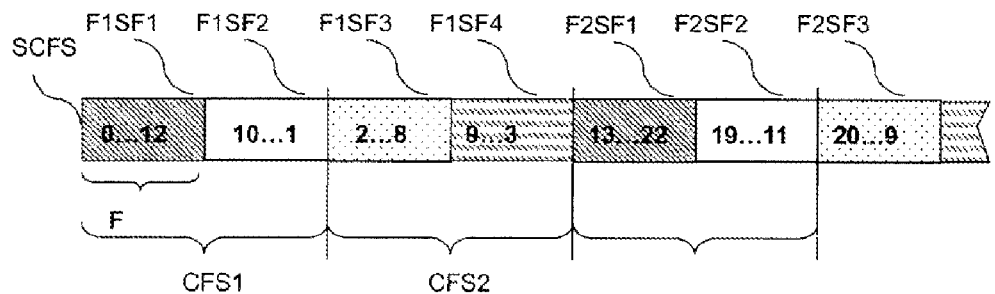

In conjunction with FIG. 3c, the case of a complex encapsulation according to which the substreams are split up into fragments F of fixed size is now considered. As in the previous example, the sequence of pairs is obtained by scanning the substreams SF1 to SF4 in the order of scanning of the lines and by iteratively tapping off the fragments according to the order of the columns. It is noted that all the fragments FiSFj, with i and j integers greater than or equal to 1, Fi being the ith fragment of the jth substream, do not comprise an equal number of super-blocks. This is due to the fact that the encoding of a super-block requires a variable quantity of data coded as a function of the image part that it represents.

Figure 4A:
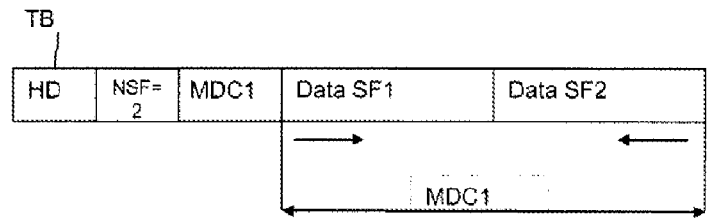
FIGS. 4a and 4c more generally present the structure of a binary train according to an embodiment of the invention obtained respectively according to the simple and complex modes of encapsulation.

In conjunction with FIG. 4a, the format of a binary train TB obtained on the basis of two substreams SF1 and SF2 by the encapsulation method according to an embodiment of the invention is more generally presented. The binary train obtained therefore comprises a single pair of symmetric substreams, consisting of the first substream SF1 and of the second substream SF2 reversed. The horizontal arrows indicate the directions of reading of the useful data of each substream. The binary train also comprises a header HD comprising metadata, relating for example to a type of useful data transported. According to an embodiment of the invention, the binary train TB furthermore comprises metadata MDC relating to the number of substreams and to the size of the symmetric pairs transported. The information item relating to the number of substreams allows in particular the decoder to adapt its decoding capacities to the binary train received. It will be noted that this number of substreams may be identical for all the images or variable as a function of the type of image I, P or B.

Figure 4B:
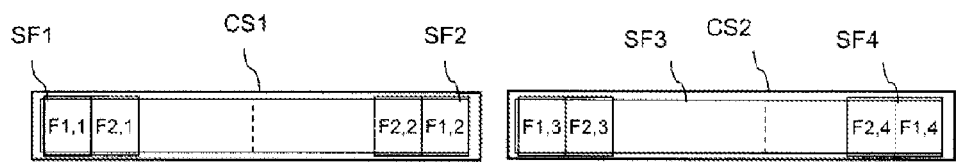
FIG. 4b illustrates the step of grouping fragments of substreams into pairs of fragments according to one embodiment of the invention.
Figure 4C:
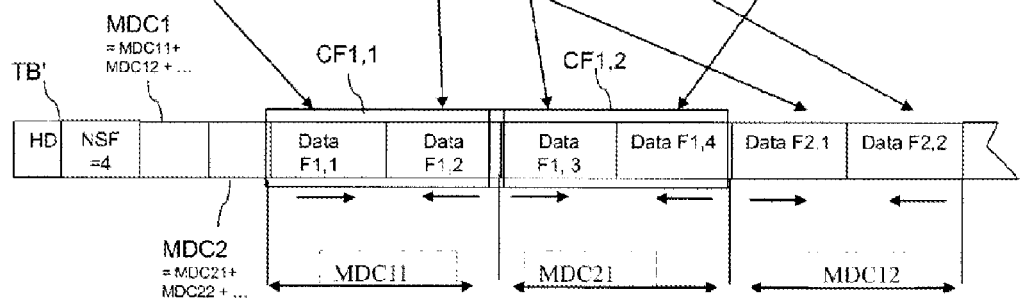

In conjunction with FIGS. 4b and 4c, an exemplary complex encapsulation of 4 substreams SF1 to SF4 in a binary train TB' is presented. The fragments of substreams are of fixed size, for example equal to 100 bytes. FIG. 4b presents two pairs of symmetric substreams CS1 and CS2, formed on the basis of the 4 substreams SF1 to SF4 according to an embodiment of the invention. The arrows drawn between FIGS. 4b and 4c illustrate the step of grouping the fragments arising from the two pairs of substreams CS1 and CS2 into pairs of fragments CFi and their concatenation in a sequence SCF according to an order of predetermined iterative scanning of the pairs of substreams. In an advantageous manner, this order of scanning adheres to the order of scanning of the substreams used to group the plurality of substreams into pairs.

Stated otherwise, the pairs of substreams CS1 and CS2 are scanned according to the usual order of reading for their first substream and the reverse order of reading for their second substream. For the pair CS1, the fragment F1,1 of substream SF1 is grouped together with the fragment F1, 2 of substream SF2 in a pair of fragments CF1,1, and then the fragment F1,3 of substream SF3 is grouped together with the fragment F1, 4 of substream SF4 in a pair of fragments CF1,2, and so on and so forth.

As regards the signaling of a complex encapsulation, that is to say comprising fragments of substreams of data, various signaling modes are possible:

The size of each pair of whole substreams is signaled once at the start of the binary train. By counting the number of bits received for each substream, the decoder can thus readily identify the last fragment of a substream or of a pair of substreams. In conjunction with FIG. 4a, for example, MDC1 indicates the size of pair 1 (pair 1=SF1, SF2) MDC2 that of pair 2 (pair 2=SF3, SF4).

The number of fragments of each substream or pairs of substreams as well as the size of the last fragment are signaled once at the start of the binary train.

A bit associated with each fragment indicating whether this fragment is the last for the substream, if this is the case the size of the last fragment is signaled. the size of a substream is indicated as number of bytes.

Transport of the binary train created:

The data of the fragments or substreams constituting the binary train are dispatched in packets according to the transport mechanism adopted, for example RTP or MPEG-2 TS.

The additional metadata associated with the pairs of substreams according to an embodiment of the invention will be placed in a pseudo header. According to the RTP protocol for example, this pseudo header traditionally encapsulates the data of the NALU/VCL layer accessible at the transport level. The mode of encapsulation (simple or complex) will have to be signaled by the customary signaling mechanisms of the transport format (for example SDP for RTP), and will not be able to change in the course of a session.

Figure 5:
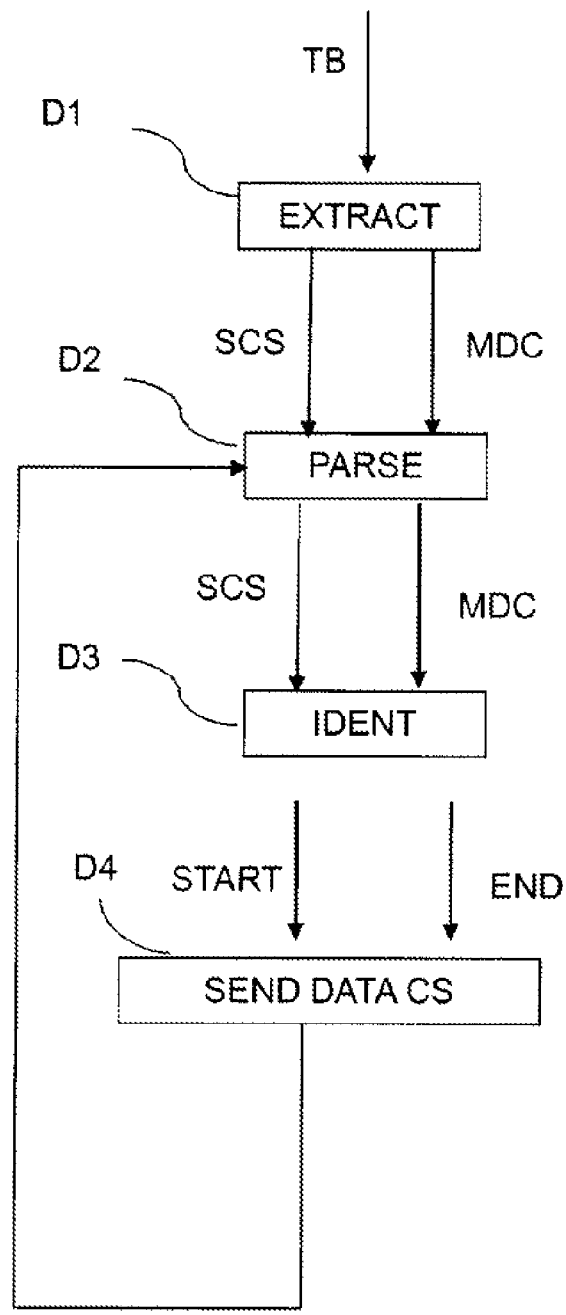
FIG. 5 presents the main steps of the de-encapsulation method, according to one embodiment of the invention.

De-encapsulation of the binary train and parallel decoding:

The de-encapsulation method according to an embodiment of the invention will now be described in conjunction with FIG. 5. On receipt of a binary train TB created by a method for encapsulating a plurality SF1 to SFN of streams of data coded according to an embodiment of the invention, the de-encapsulation method implements a step D1 of analyzing the binary train TB, in the course of which information items or metadata MDC relating to a number of substreams and to the sizes of the pairs of substreams are extracted.

The number of pairs is deduced from the number of substreams and is equal to half the number of substreams if this number is even or to half the number of substreams plus one if this number is odd.

An information item relating to the mode of encapsulation used belonging to a group comprising at least a simple mode of encapsulation and a complex mode of encapsulation is also extracted.

The de-encapsulation method according to an embodiment of the invention thereafter implements a step D2 of scanning the useful data of the binary train received, and as long as all the useful data have not been scanned, a step D3 of identifying the start and end positions of the symmetric pairs received is implemented. The useful data situated between the identified start and end positions are dispatched in D4 to a decoding device able to command two distinct processors regarding the parallel decoding of the useful data relating to the two elements of the symmetric pair considered, whether this is a whole substream according to a first embodiment of the invention (simple mode of encapsulation) or a substream fragment (complex mode of encapsulation).

Case of a simple mode of encapsulation:

In the case of a simple mode of encapsulation, the pairs received are pairs of substreams.

The start and end positions of the useful data relating to each pair received are detected in the binary train with the aid of the information items, received as metadata, relating to the sizes of the pairs of substreams.

Case of a complex mode of encapsulation:

In this mode, the substreams have been split up into fragments of substreams of fixed size. This allows the terminal to begin to decode as soon as a part of the binary train has been received. This fixed size is assumed known to the device able to implement the de-encapsulation method according to an embodiment of the invention. As a variant, it may be transmitted in a packet of data of the sequence of SPS type or else in a header of the signaling of the transport protocol.

In D3, the useful part of the binary train is scanned and the start and end positions of each pair of fragments of substreams are identified with the aid of the metadata extracted. Beginning from a first start position situated at the start of the useful data, the first end position is situated at a distance equal to twice the fixed size of a fragment.

Subsequently, the following algorithm is applied:

Let M be the number of pairs of substreams. The total size SCi of each pair of substreams is known. Each substream comprises a variable number of fragments. Each fragment is of constant size K, except (possibly) the last fragment, a pair of fragments is therefore of constant size 2*K, except (possibly) the last pair of fragments.

The decoder can extract the fragments according to the following algorithm: for each pair of substreams, the size read TLi for the pair i having been previously initialized to zero.

If the total size SCi of the pair of substreams is reached

Then end for this pair of substreams

Else

If more than 2 K bytes still remain to be read

Then reading of the 2 K bytes and extraction of the start and end positions

Else reading of the remaining bytes increment the size read TLi by 2 K for this pair of substreams transmit the useful data corresponding to the pair to the queues of the decoding device.

According to a step D4, the useful data for a pair CS are thereafter dispatched on the fly to a decoding device able to make two distinct processors decode in parallel respectively the first and the second fragments F1 and F2 of the substreams SF1 and SF2 of the pair CS. The data of the second fragment F2 are read by the processor concerned, starting from the end of the data. It is considered that the two processors are capable of detecting the end of the data to be decoded for their respective fragments, for example by detecting a last block of a sub-sequence or of an image or else because the size K of the fragment of the decoded binary data is reached. Each process performs the decoding of the data that it has received in parallel with the other processes while taking account of the synchronization constraints if necessary.

Steps D2, D3 and D4 are repeated as long as useful data of the binary train are received. The data extracted from each pair of fragments of substreams in D3 are extracted according to a predetermined iterative scanning of the pairs of substreams.

Finally, the simplified structure of an encapsulation device and of a de-encapsulation device according to the embodiments described hereinabove are presented in conjunction with FIGS. 6 and 7.

Figure 6:
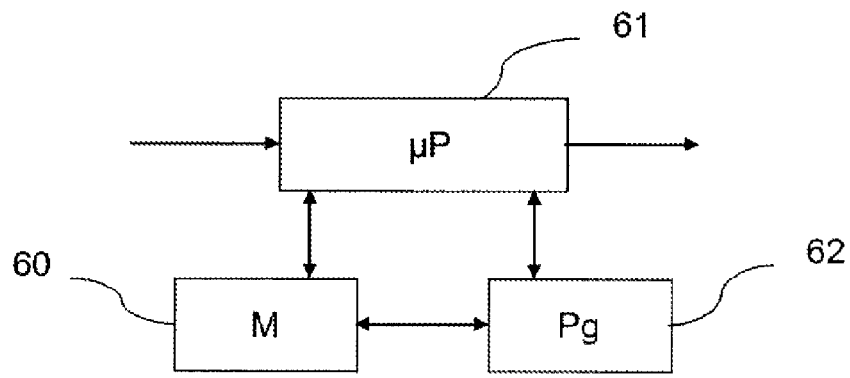
FIGS. 6 and 7 present respectively the structure of a coding device and of a decoding device, according to a particular embodiment of the invention.

As illustrated in FIG. 6, such an encapsulation device comprises a memory 61 comprising a buffer memory, a processing unit 62, equipped for example with a microprocessor µP, and driven by the computer program 63, implementing the encapsulation method according to an embodiment of the invention.

On initialization, the code instructions of the computer program 63 are for example loaded into a RAM memory before being executed by the processor of the processing unit 62. The processing unit 62 receives as input a plurality of substreams of coded data and metadata such as the sizes of the symmetric pairs and the number of substreams transported. The microprocessor of the processing unit 62 implements the steps of the previously described encapsulation method, according to the instructions of the computer program 63. Accordingly, the encapsulation device comprises, in addition to the buffer memory 61, means for grouping the substreams of data into pairs of substreams according to an order of predetermined iterative scanning of said plurality of substreams, means for obtaining a symmetric pair, on the basis of a pair, by reversing an order of the data making up the second substream of the pair, means for concatenating the pairs according to an order of predetermined iterative scanning of the pairs of substreams obtained into a sequence; and means for creating the binary train which are able to encapsulate said sequence and information items relating to a number of substreams and to the sizes of the symmetric pairs. The processing unit 62 therefore transmits, to at least one de-encapsulation device, a binary train encapsulating the plurality of substreams of coded data.

Figure 7:
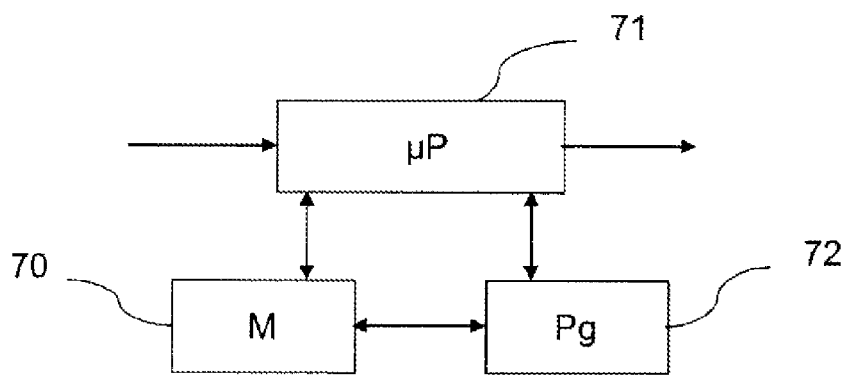

As illustrated in FIG. 7, such a de-encapsulation device comprises for its part a memory 71 comprising a buffer memory, a processing unit 72, equipped for example with a microprocessor µP, and driven by the computer program 73, implementing the de-encapsulation method according to an embodiment of the invention.

On initialization, the code instructions of the computer program 73 are for example loaded into a RAM memory before being executed by the processor of the processing unit 72. The processing unit 72 receives as input a binary train representative of at least one coded image. The microprocessor of the processing unit 72 implements the steps of the previously described de-encapsulation method, according to the instructions of the computer program 73. Accordingly, the de-encapsulation device comprises, in addition to the buffer memory 71, means for extracting the information items relating to a number of substreams and to sizes of pairs of substreams, means for scanning the useful data of the binary train received, able to implement, as long as the scanning is not completed, means for identifying a start position and an end position of a pair on the basis of said information items extracted and means for dispatching the useful data relating to the pair situated between said start and end positions to a decoding device able to make two distinct processors perform a decoding in parallel of the useful data relating to the two elements of said pair, from said positions, the first in a usual direction and the second in a reverse direction of reading of the data.

The invention claimed is:

1. A method for de-encapsulating comprising the following steps:
receiving a binary train comprising a plurality of substreams of coded data, a substream of data being obtained by entropy coding of a sub-sequence of symbols which is representative of an image or of a series of images, the substreams of coded data being grouped into pairs of substreams according to an order of predetermined iterative scanning of said plurality of substreams, said pairs of substreams comprising a first and a second substream being symmetrical by reversal of an order of the data making up the second substream of the pair,
extracting information items from the binary train relating to a number of substreams and to sizes of pairs of substreams;
scanning useful data of the binary train received, in the course of which the following steps are implemented:
as long as the scanning has not finished:
identifying a start position and of an end position of a pair on the basis of said extracted information items; and
dispatching the useful data relating to the pair, said data being situated between said start and end positions, to a decoding device able to make two distinct processors perform a decoding in parallel of the useful data relating to the two elements of said pair, from said positions, the first in a usual direction and the second in a reverse direction of reading of the data,
wherein, in said binary train, the first and the second substreams are split into fragments of fixed size and the fragments are grouped into pairs of symmetric fragments by tapping off, for each pair, a first fragment in the first substream of the pair from the start of the data relating to the pair of substreams, according to a usual direction of reading, and a second fragment in the second substream of the pair from the end of the data relating to the pair of substreams, according to a reverse direction of reading, and
the step of extracting furthermore comprises extracting information items relating to the fixed size of a fragment, and the identifying and dispatching steps are applied to the pairs of symmetric fragments.

2. A device for de-encapsulating comprising:
a processor configured to:
receive a binary train comprising a plurality of substreams of coded data, a substream of data being obtained by entropy coding of a sub-sequence of symbols which is representative of an image or of a series of images, the substreams of coded data being grouped into pairs of substreams according to an order of predetermined iterative scanning of said plurality of substreams, wherein said pairs of substreams are symmetrical by reversal of an order of the data making up the second substream of the pair
extract information items from the binary train relating to a number of substreams and to sizes of pairs of substreams;
scan useful data of the binary train received, in the course of which the following steps are implemented:
as long as the scanning has not finished:
identifying a start position and of an end position of a symmetric pair on the basis of said extracted information items;
dispatching the useful data relating to the pair situated between said start and end positions to a decoding device configured to make two distinct processors perform a decoding in parallel of the useful data relating to the two elements of said pair, from said positions, the first in a usual direction and the second in a reverse direction of reading of the data,
wherein, in said binary train, the first and the second substreams are split into fragments of fixed size and the fragments are grouped into pairs of symmetric fragments by tapping off, for each pair, a first fragment in the first substream of the pair from the start of the data relating to the pair of substreams, according to a usual direction of reading, and a second fragment in the second substream of the pair from the end of the data relating to the pair of substreams, according to a reverse direction of reading, and
wherein the processor is further configured to extract from the binary data train information items relating to the size of a fragment and to identify the start and end positions on the basis of the pairs of symmetric fragments.

3. A device for decoding comprising:
first and second distinct decoding processors configured to decode in parallel with one another; and
a de-encapsulating device configured: to receive a plurality of substreams of coded data, a substream of data being obtained by entropy coding of a sub-sequence of symbols which is representative of an image or of a series of images, the substreams of coded data being grouped into pairs of substreams according to an order of predetermined iterative scanning of said plurality of substreams, wherein said pairs of substreams are symmetrical by reversal of an order of the data making up the second substream of the pair; to extract information items from the binary train relating to a number of substreams and to sizes of pairs of substreams; and to scan useful data of the binary train received, in the course of which the following steps are implemented as long as the scanning has not finished:
identifying a start position and of an end position of a symmetric pair on the basis of said extracted information items; and
dispatching the useful data relating to the pair situated between said start and end positions to the first and second distinct decoding processors, which are configured to perform a decoding in parallel of the useful data relating to the two elements of said pair, from said positions, the first in a usual direction and the second in a reverse direction of reading of the data,
wherein, in said binary train, the first and the second substreams are split into fragments of fixed size and the fragments are grouped into pairs of symmetric fragments by tapping off, for each pair, a first fragment in the first substream of the pair from the start of the data relating to the pair of substreams, according to a usual direction of reading, and a second fragment in the second substream of the pair from the end of the data relating to the pair of substreams, according to a reverse direction of reading, and
wherein the de-encapsulating device is further configured to extract information items relating to the fixed size of a fragment, and the identifying and dispatching steps are applied to the pairs of symmetric fragments.

4. A non-transitory computer readable medium comprising a computer program stored thereon, which comprises program code instructions for performing a method of de-encapsulating when said instructions are executed by a processor, wherein the instructions comprise:
instructions configured to receive a binary train comprising a plurality of substreams of coded data, a substream of data being obtained by entropy coding of a sub-sequence of symbols, which is representative of an image or of a series of images, the substreams of coded data being grouped into pairs of substreams according to an order of predetermined iterative scanning of said plurality of substreams, wherein said pairs of substreams are symmetrical by reversal of an order of the data making up the second substream of the pair;
instructions configured to extract information items from the binary train relating to a number of substreams and to sizes of pairs of substreams;
instructions configured to scan useful data of the binary train received, in the course of which the following steps are implemented:
as long as the scanning has not finished:
identifying a start position and of an end position of a pair on the basis of said extracted information items; and
dispatching the useful data relating to the pair, said data being situated between said start and end positions, to a decoding device able to make two distinct processors perform a decoding in parallel of the useful data relating to the two elements of said pair, from said positions, the first in a usual direction and the second in a reverse direction of reading of the data, and
wherein, in said binary train, the first and the second substreams are split into fragments of fixed size and the fragments are grouped into pairs of symmetric fragments by tapping off, for each pair, a first fragment in the first substream of the pair from the start of the data relating to the pair of substreams, according to a usual direction of reading, and a second fragment in the second substream of the pair from the end of the data relating to the pair of substreams, according to a reverse direction of reading, and
the instructions configured to extract information are further configured to extract information items relating to the fixed size of a fragment, and the identifying and dispatching steps are applied to the pairs of symmetric fragments.

* * * * *